United States Patent
Kim et al.

(10) Patent No.: US 9,439,079 B2
(45) Date of Patent: Sep. 6, 2016

(54) METHOD AND APPARATUS FOR TRANSCEIVING CHANNEL AVAILABILITY QUERY AND RESPONSE IN A WIRELESS COMMUNICATION SYSTEM

(71) Applicant: LG ELECTRONICS INC., Seoul (KR)

(72) Inventors: Eunsun Kim, Gyeonggi-do (KR); Yongho Seok, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/824,672

(22) Filed: Aug. 12, 2015

(65) Prior Publication Data

US 2016/0066194 A1 Mar. 3, 2016

Related U.S. Application Data

(63) Continuation of application No. 13/992,316, filed as application No. PCT/KR2011/009469 on Dec. 8, 2011, now Pat. No. 9,137,786.

(60) Provisional application No. 61/472,630, filed on Apr. 7, 2011, provisional application No. 61/420,777, filed on Dec. 8, 2010.

(51) Int. Cl.
*H04W 72/00* (2009.01)
*H04W 16/14* (2009.01)
*H04W 72/04* (2009.01)
(Continued)

(52) U.S. Cl.
CPC .............. *H04W 16/14* (2013.01); *H04W 4/00* (2013.01); *H04W 4/02* (2013.01); *H04W 72/04* (2013.01); *H04W 72/044* (2013.01); *H04W 72/00* (2013.01); *H04W 84/12* (2013.01)

(58) Field of Classification Search
CPC ... H04W 16/14; H04W 72/04; H04W 72/00; H04W 72/044; H04W 4/00; H04W 4/02; H04W 84/12
USPC ....... 455/450, 509, 179.1, 451, 452.1, 550.1
See application file for complete search history.

(56) References Cited

U.S. PATENT DOCUMENTS

2009/0111463 A1  4/2009  Simms et al.
2009/0197627 A1  8/2009  Kuffner et al.
(Continued)

FOREIGN PATENT DOCUMENTS

KR  10-2010-0117099 A  11/2010
WO  2010/026858 A1  3/2010
WO  2010/117998 A2  10/2010

OTHER PUBLICATIONS

International Search Report and Written Opinion issued in corresponding International Patent Application No. PCT/KR2012/000176 dated Sep. 24, 2012.

(Continued)

*Primary Examiner* — Khai M Nguyen
(74) *Attorney, Agent, or Firm* — Morgan, Lewis & Bockius LLP

(57) ABSTRACT

The present invention relates to a wireless communication system, and more particularly, to a method and apparatus for transceiving channel availability query and response in a wireless communication system. According to the present invention, a scheme is provided to enable devices which operate in TVWS to request/response information on an available channel in a plurality of geographical locations in a more accurate and efficient manner.

10 Claims, 18 Drawing Sheets

| Info ID | Length | Requester STA Address | Responder STA Address | Enablement Identifer | FCC Identifier | Serial Number | LCI | Device Type | Spectrum mask type | Transmission Power Level | Service coverage |
|---|---|---|---|---|---|---|---|---|---|---|---|
| Octets: 1 | 2 | 6 | 6 | 2 | Variable | Variable | Variable | Variable | 1 | 1 | 1 |

(51) Int. Cl.
*H04W 4/00* (2009.01)
*H04W 4/02* (2009.01)
*H04W 84/12* (2009.01)

(56) References Cited

U.S. PATENT DOCUMENTS

| | | |
|---|---|---|
| 2010/0220687 A1 | 9/2010 | Reznik et al. |
| 2010/0261423 A1 | 10/2010 | Stanforth et al. |
| 2010/0304680 A1 | 12/2010 | Kuffner et al. |
| 2010/0330919 A1 | 12/2010 | Gurney et al. |
| 2011/0237179 A1 | 9/2011 | Sagae et al. |
| 2011/0250846 A1 | 10/2011 | Shu |
| 2011/0280180 A1* | 11/2011 | McCann ............... H04L 63/08 370/328 |
| 2011/0319114 A1 | 12/2011 | Tavildar et al. |
| 2012/0093092 A1* | 4/2012 | Kasslin ............... H04W 72/082 370/329 |
| 2012/0184318 A1 | 7/2012 | Lee et al. |
| 2012/0282959 A1* | 11/2012 | Abraham ............. H04L 5/0096 455/500 |
| 2013/0103684 A1 | 4/2013 | Yee et al. |

OTHER PUBLICATIONS

International Search Report issued in corresponding International Patent Application No. PCT/KR2011/009469 dated May 22, 2012.

* cited by examiner

FIG. 5

| Element ID | Length | DSE Registered Location element body field |
|---|---|---|
| 1 | 1 | 20 |

Octets:

FIG. 6

| B0 | | B5 | B6 | | | B30 |
|---|---|---|---|---|---|---|
| Latitude Resolution | | | Latitude Fraction | | | |
| Bits | | 6 | | 25 | | |

| B31 | | | B39 | B40 | | B45 |
|---|---|---|---|---|---|---|
| Latitude Integer | | | | Longitude Resolution | | |
| Bits | | 6 | | 6 | | |

| B31 | | | B70 | B71 | | B79 |
|---|---|---|---|---|---|---|
| Longitude Fraction | | | | Longitude Integer | | |
| Bits | | 25 | | 9 | | |

| B80 | | B83 | B84 | | B89 | B90 | | B97 |
|---|---|---|---|---|---|---|---|---|
| Altitude Type | | | Altitude Resolution | | | Altitude Fraction | | |
| Bits | 4 | | | 6 | | | 8 | |

| B98 | | B119 | B120 | | B122 |
|---|---|---|---|---|---|
| Altitude Interger | | | Altitude Fraction | | |
| Bits | | 22 | | 3 | |

| B123 | B124 | B125 | B126 | | B127 |
|---|---|---|---|---|---|
| RegLoc Agreement | Regloc DSE | Dependent STA | Reserved | | |
| Bits | 1 | 1 | 1 | 2 | |

| B128 | | B143 |
|---|---|---|
| Dependent Erablement Identifier | | |
| Bits | 16 | |

| B144 | | B151 | B152 | | B159 |
|---|---|---|---|---|---|
| Regulatory Class | | | Channel Number | | |
| Bits | 8 | | 8 | | |

FIG. 7

| Category | Action | Requester STA Address | Responder STA Address | Reason Result Code | Enablement Identifer |
|---|---|---|---|---|---|

Octets :    1    2    6    6    1    2

FIG. 8

| Element ID | Length | Advertisement Protocol Tuple #1 | Advertisement Protocol Tuple #2 (optional) | Advertisement Protocol Tuple #n (optional) |
|---|---|---|---|---|

Octets :    1    1    Variable    Variable    Variable

FIG. 11

| Info ID | Length | Requester STA Address | Responder STA Address | Enablement Identifier | FCC Identifier | Serial Number | LCI | Device Type | Spectrum mask type | Transmission Power Level | Service coverage |
|---|---|---|---|---|---|---|---|---|---|---|---|
| 1 | 2 | 6 | 6 | 2 | Variable | Variable | Variable | Variable | 1 | 1 | 1 |

Octets:

FIG. 12

| Info ID | Length | Requester STA Address | Responder STA Address | Enablement Identifer | Device Type | White Space Map | Spectrum mask type |
|---------|--------|----------------------|----------------------|---------------------|-------------|-----------------|--------------------|
| Octets: 1 | 2 | 6 | 6 | 2 | 1 | Variable | 1 |

FIG. 13

| Category | Action | Requester STA Address | Responder STA Address | Enablement Identifier | FCC Identifier | Serial Number | LCI | Device Type | Spectrum mask type | Transmission Power Level | Service coverage |
|---|---|---|---|---|---|---|---|---|---|---|---|
| 1 | 2 | 6 | 6 | 2 | Variable | Variable | Variable | Variable | 1 | 1 | 1 |

Octets :

FIG. 14

| Category | Action | Requester STA Address | Responder STA Address | Reason Result Code | Enablement Identifier | Device Type | White Space Map | Spectrum mask type |
|---|---|---|---|---|---|---|---|---|
| 1 | 1 | 6 | 6 | 1 | 2 | 1 | Variable | 1 |

Octets:

FIG. 16

| Latitude Resolution | Latitude Fraction | Latitude Integer | Longitude Resolution | Longitude Fraction | Longitude Integer | Altitude type | Altitude Resolution | Altitude Fraction | Altitude Integer |
|---|---|---|---|---|---|---|---|---|---|
| Bits: 6 | 25 | 9 | 6 | 25 | 9 | 6 | 6 | 8 | 22 |

FIG. 17

| Length | Latitude Resolution | Latitude Fraction | Latitude Integer | Longitude Resolution | Longitude Fraction | Longitude Integer | Altitude type | Altitude Resolution | Altitude Fraction | Altitude Integer |
|---|---|---|---|---|---|---|---|---|---|---|
| Bits: 8 | 6 | 25 | 9 | 6 | 25 | 9 | 6 | 6 | 8 | 22 | repeated

FIG. 18

| Latitude Resolution | Latitude Fraction | Latitude Integer | Latitude Radius | Longitude Resolution | Longitude Fraction | Longitude Integer | Longitude Radius | Altitude type | Altitude Resolution | Altitude Fraction | Altitude Integer | Altitude Radius |
|---|---|---|---|---|---|---|---|---|---|---|---|---|
| Bits: 6 | 25 | 9 | 6 | 6 | 25 | 9 | 6 | 4 | 6 | 8 | 22 | 6 |

FIG. 19

| Latitude Resolution /Radius | Latitude Fraction | Latitude Integer | Longitude Resolution /Radius | Longitude Fraction | Longitude Integer | Altitude type | Altitude Resolution /Radius | Altitude Fraction | Altitude Integer |
|---|---|---|---|---|---|---|---|---|---|
| Bits: 6 | 25 | 9 | 6 | 25 | 9 | 6 | 6 | 8 | 22 |

FIG. 20

| Info ID | Length | Requester STA Address | Responder STA Address | Enablement Identifier | Device Type | Operating Class | channel Number | Power Constraint |
|---|---|---|---|---|---|---|---|---|
| 1 | 2 | 6 | 6 | 2 | 1 | 1 | 1 | 1 |

Octets:

repeated (over Operating Class, channel Number, Power Constraint)

FIG. 21

| Category | Action | Requester STA Address | Responder STA Address | Enablement Identifier | Device Type | Operating Class | channel Number | Power Constraint |
|---|---|---|---|---|---|---|---|---| repeated (over Operating Class, channel Number, Power Constraint)

METHOD AND APPARATUS FOR TRANSCEIVING CHANNEL AVAILABILITY QUERY AND RESPONSE IN A WIRELESS COMMUNICATION SYSTEM

CROSS REFERENCE TO RELATED APPLICATIONS

The present application is a continuation of U.S. patent application Ser. No. 13/992,316, filed on Jun. 7, 2013, the entire disclosure of which is hereby incorporated by reference for all purposes as if fully set forth herein. U.S. patent application Ser. No. 13/992,316 is a U.S. National Stage Entry of PCT International Application No. PCT/KR2011/009469, filed on Dec. 8, 2011, and claims the benefit of U.S. Provisional Applications No. 61/472,630, filed on Apr. 7, 2011; and No. 61/420,777, filed on Dec. 8, 2010.

TECHNICAL FIELD

The present invention relates to method and apparatus for transceiving channel availability query and response in a wireless communication system.

BACKGROUND ART

The standard for WLAN (wireless local area network) technology is being developed as IEEE (institute of electrical and electronics engineers) 802.11 standard. IEEE 802.11a/b uses an unlicensed band on 2.4 or 5 GHz. The IEEE 802.11b provides a data rate of 11 Mbps, while the IEEE 802.11a provides a data rate of 54 Mbps. IEEE 802.11g applies OFDM (orthogonal frequency division multiplexing) on 2.4 GHz to provide a data rate of 54 Mbps. IEEE 802.11n applies MIMO-OFDM (multiple input multiple output-OFDM) to provide a data rate of 300 Mbps for 4 spatial streams. The IEEE 802.11n supports channel bandwidths up to 40 MHz. In this case, a data rate of 600 Mbps is provided.

Currently, IEEE 802.11af standard is being developed to regulate an operation of an unlicensed device on TVWS (TV whitespace) band.

TVWS includes VHF (very high frequency) bands (e.g., 54~60 MHz, 76~88 MHz, 174~216 MHz) and UHF (ultra high frequency) band (e.g., 470~698 MHz) assigned for TV broadcasting, which mean the frequency bands allowed to be used for unlicensed devices under the condition that communications of licensed device (e.g., TV broadcasts, wireless microphones, etc.) operating on the corresponding frequency bands are not interrupted.

On 512~608 MHz or 614~698 MHz, operations are allowed for all unlicensed devices except several special cases. Yet, the bands 54~60 MHz, 76~88 MHz, 174~216 MHz and 470~512 MHz are allowed for the communications between fixed devices only. In this case, the fixed device means the device configured to perform a transmission at a determined location only. In the following description, a whitespace band includes the aforementioned TVWS, by which the present invention may be non-limited.

An unlicensed device desiring to use the whitespace band should provide a protection function for a licensed device. Hence, before a transmission is started on the whitespace band, it is mandatory to check whether a licensed device occupies the corresponding band. In particular, a use of an unlicensed device can be allowed only if a licensed device is not in use on a whitespace band.

To this end, an unlicensed device accesses a GDB (geo-location database) (or TV band database) through Internet or dedicated network and should obtain information on a channel list available for the corresponding area. In this case, the GDB is the database for storing and managing information on licensed devices registered therein and channel use information that dynamically changes depending on geo-locations and use times of the corresponding licensed devices. In order to solve the problem of co-existence between unlicensed devices that use the whitespace, such a signaling protocol as a common beacon frame and the like, a spectrum sensing mechanism and the like are available.

In IEEE 802.11 system, TVWS user equipment may indicate an unlicensed device that operates using IEEE 802.11 MAC (medium access control) layer and PHY (physical) layer. In the present specification, a station (STA) indicates a TVWS user equipment that operates on TVWS spectrum unless separate description.

The STA should provide a function of protecting an incumbent user. In this case, the incumbent user includes a licensed user (e.g., a TV user, a wireless microphone, etc.) and means a user to which a priority access is granted. In particular, in case that the incumbent user is using TVWS, the STA should stop using a corresponding channel. Hence, the STA finds out an available channel (i.e., a channel not used by a licensed device) available for an unlicensed device and then should operate on the found available channel.

A method for an STA to find out an available channel may include one of a scheme of performing a spectrum sensing mechanism, a scheme of finding out a TV channel schedule by accessing a GDB, and the like. For the spectrum sensing mechanism, it is able to utilize one of an energy detection scheme (i.e., if a strength of a received signal is equal to or greater than a predetermined value, determining that an incumbent user is using a corresponding channel), a feature detection scheme (i.e., if a digital TV preamble is detected, determining that an incumbent user is using a corresponding channel), and the like. Subsequently, the STA should check whether a corresponding channel us used by a licensed device at a corresponding location in a manner of accessing a GDB and then acquires GDB information based on its location information. In doing so, the access to the GDB and the information acquisition should be performed frequently enough to protect the licensed device.

If it is determined that the incumbent user is using a channel right adjacent to a currently used channel through the spectrum sensing scheme or the GDB, a user equipment (or STA) or a base station (or an access point (AP)) can protect the incumbent user in a manner of using a transmit power.

As mentioned in the above description, in order for an STA to operate on a whitespace band, it is necessary to acquire available channel information within the corresponding whitespace band. In case of an STA incapable of accessing a GDB or a dependent STA, information on an available channel can be acquired from an STA capable of accessing a GDB or an enabling STA. And, such an available information acquiring process is called a channel availability query (CAQ) process. The CAQ process can include a CAQ request for requesting an available channel list and a CAR response for providing the available channel list. In some cases, an unsolicited CAQ response may be provided.

DISCLOSURE OF THE INVENTION

Technical Problem

According to the present invention, in case that each device attempting to operate on TVWS acquires an available channel list through a CAQ request/response procedure from a TV band database (or an enabling STA), the technical object of the present invention is provide a method of requesting/responding information on a channel available at a plurality of geo-locations. Moreover, the technical object of the present invention is to provide a method of efficiently requesting and responding more accurate available channel information on a plurality of geo-locations.

Technical objects obtainable from the present invention are non-limited by the above-mentioned technical tasks. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, a method of receiving an available channel information, which is received by a requester station (STA) in a wireless communication system, according to one embodiment of the present invention may include the steps of sending a channel availability query (CAQ) request message including a location information of the requester STA to a responder STA and receiving a CAQ response message including an available channel list from the responder STA.

To further achieve these and other advantages and in accordance with the purpose of the present invention, a method of transmitting an available channel information, which is transmitted by a responder station (STA) in a wireless communication system, according to another embodiment of the present invention may include the steps of receiving a channel availability query (CAQ) request message including a location information of a requester STA from the requester STA and sending a CAQ response message including an available channel list to the requester STA by creating the CAQ response message using information included in the CAQ request message.

To further achieve these and other advantages and in accordance with the purpose of the present invention, an available channel information receiving station, which is a requester station (STA) configured to receive an available channel information in a wireless communication system, according to a further embodiment of the present invention may include a processor configured to create a channel availability query (CAQ) request message including a location information of the requester STA and a transceiver configured to send the created CAQ request message to a responder STA, the transceiver configured to receive a CAQ response message including an available channel list from the responder STA.

To further achieve these and other advantages and in accordance with the purpose of the present invention, an available channel information transmitting station, which is a responder station (STA) configured to transmit an available channel information in a wireless communication system, according to another further embodiment of the present invention may include a transceiver configured to receive a channel availability query (CAQ) request message including a location information of a requester STA from the requester STA and a processor configured to create a CAQ response message including an available channel list using information included in the CAQ request message, the processor configured to transmit the created CAQ response message to the requester STA via the transceiver.

The following matters may be applicable in common to the above-mentioned embodiments of the present invention.

Preferably, the CAQ request message may further include an information on a transmit power level of the requester STA.

Preferably, the available channel list may be determined based on at least one of the location information of the requester STA and the information on the transmit power level.

Preferably, the CAQ response message may further include an allowable transmit power information for a channel belonging to the available channel list.

Preferably, the CAQ request message may further include an information on a service coverage of the requester STA.

Preferably, the location information may include at least one of a resolution information on a location of the requester STA and a radius information on the location of the requester STA.

More preferably, the resolution information or the radius information may include a service coverage of the requester STA.

Preferably, the location information may include an information on a plurality of the locations of the requester STA.

Preferably, the CAQ request message may further include at least one of an FCC (federal communications commission) identifier information, a manufacturer serial number information, a device type information and a spectrum mask type information of the requester STA.

Preferably, the available channel list may be provided in form of WSM (white space map) or WLAN (wireless location area network) channel number.

Preferably, the CAQ response message may further include at least one of a device type information and a spectrum mask type information of the requester STA.

Preferably, the CAQ request message and the CAQ response message may use RLQP (registered location query protocol).

The above-mentioned general description of the present invention and the following details of the present invention are exemplary and may be provided for the additional description of the invention disclosed in claims.

Advantageous Effects

According to the present invention, a method for a device operating on TVWS to request/respond information on a channel available at a plurality of geo-locations more accurately and efficiently can be provided.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 5 is a diagram of DSE (dynamic STA enablement) registered location element format.

FIG. 6 is a diagram of a configuration of DSE registered location element body field.

FIG. 7 is a diagram of a structure of a DSE enablement frame.

FIG. 8 is a diagram of an advertisement protocol information element format.

FIG. 11 is a diagram of a CAQ request element according to one embodiment of the present invention.

FIG. 12 is a diagram of a CAQ response element according to one embodiment of the present invention.

FIG. 13 is a diagram of a CAQ request frame according to one embodiment of the present invention.

FIG. 14 is a diagram of a CAQ response frame according to one embodiment of the present invention.

FIG. 16 is a diagram of one structure of LCI field according to one embodiment of the present invention.

FIG. 17 is a diagram for one example of LCI field including information on a plurality of locations according to one embodiment of the present invention.

FIG. 18 is a diagram of another structure of LCI field according to one embodiment of the present invention.

FIG. 19 is a diagram of a further structure of LCI field according to one embodiment of the present invention.

FIG. 20 is a diagram of a CAQ response element according to another embodiment of the present invention.

FIG. 21 is a diagram of a CAQ response frame according to another embodiment of the present invention.

BEST MODE FOR INVENTION

Figure 1:
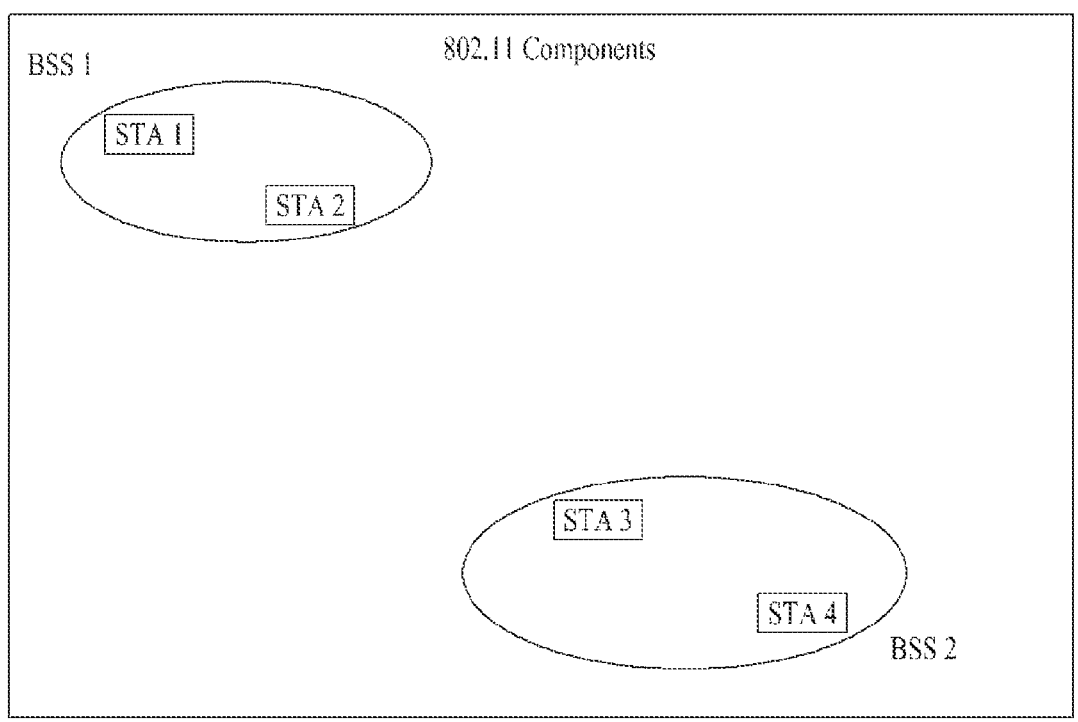
FIG. 1 is a diagram for one example of a structure of IEEE 802.11 system to which the present invention is applicable.

Reference will now be made in detail to the preferred embodiments of the present invention, examples of which are illustrated in the accompanying drawings. Detailed description disclosed together with the accompanying drawings is intended to explain not a unique embodiment of the present invention but an exemplary embodiment of the present invention. In the following detailed description of the invention includes details to help the full understanding of the present invention. Yet, it is apparent to those skilled in the art that the present invention can be implemented without these details.

First of all, the following embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, an embodiment of the present invention may be implemented by combining elements and/or features together in part. A sequence of operations explained for each embodiment of the present invention may be modifiable. Some configurations or features of one embodiment may be included in another embodiment or substituted with corresponding configurations or features of another embodiment.

Specific terminologies used for the following description may be provided to help the understanding of the present invention. And, the use of the specific terminology may be modified into another form within the scope of the technical idea of the present invention.

Occasionally, to prevent the present invention from getting vaguer, structures and/or devices known to the public may be skipped or represented as block diagrams centering on the core functions of the structures and/or devices. Wherever possible, the same reference numbers will be used throughout the drawings to refer to the same or like parts in this specification.

Embodiments of the present invention may be supported by the disclosed standard documents of at least one of wireless access systems including IEEE 802 system, 3GPP system, 3GPP LTE and LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. For clarity, the following description mainly concerns IEEE 802.11 system, by which the technical idea of the present invention may be non-limited.

FIG. 1 is a diagram for one example of a structure of IEEE 802.11 system to which the present invention is applicable.

IEEE 802.11 structure may include a plurality of components and WLAN supportive of transparent STA mobility for an upper layer can be provided by interactions of the components. A basic service set (BSS) may correspond to a basic configuration block in IEEE 802.11 LAN. FIG. 1 shows one example that two basic service sets BSS 1 and BSS 2 exist and that 2 STAs are included as members of each BSS. In particular, STA 1 and STA 2 are included in the BSS 1 and STA 3 and STA 4 are included in the BSS 2. In FIG. 1, an oval indicating the BSS can be understood as indicating a coverage area in which the STAs included in the corresponding BSS maintain communications. This area may be named a basic service area (BSA). Once the STA moves away from the BSA, it is unable to directly communicate with other STAs within the corresponding BSA.

A BSS of a most basic type in IEEE 802.11 LAN is an independent BSS (IBSS). For instance, IBSS can have a minimum configuration including 2 STAs only. Moreover, the BSS (e.g., BSS 1 or BSS 2) shown in FIG. 1, which has the simplest configuration and in which other components are omitted, may correspond to a representative example of the IBSS. Such a configuration is possible if STAs can directly communicate with each other. The above-configured LAN is not configured by being designed in advance but can be configured under the necessity of LAN. And, this may be called an ad-hoc network.

If an STA is turned on/off or enters/escapes from a BSS area, membership of the STA in a BSS can be dynamically changed. In order to obtain the membership in the BSS, The STA can join the BSS using a synchronization procedure. In order to access all services of the BSS based structure, the STA should be associated with the BSS. Thus association may be dynamically configured or may include a use of a DSS (distribution system service).

Figure 2:
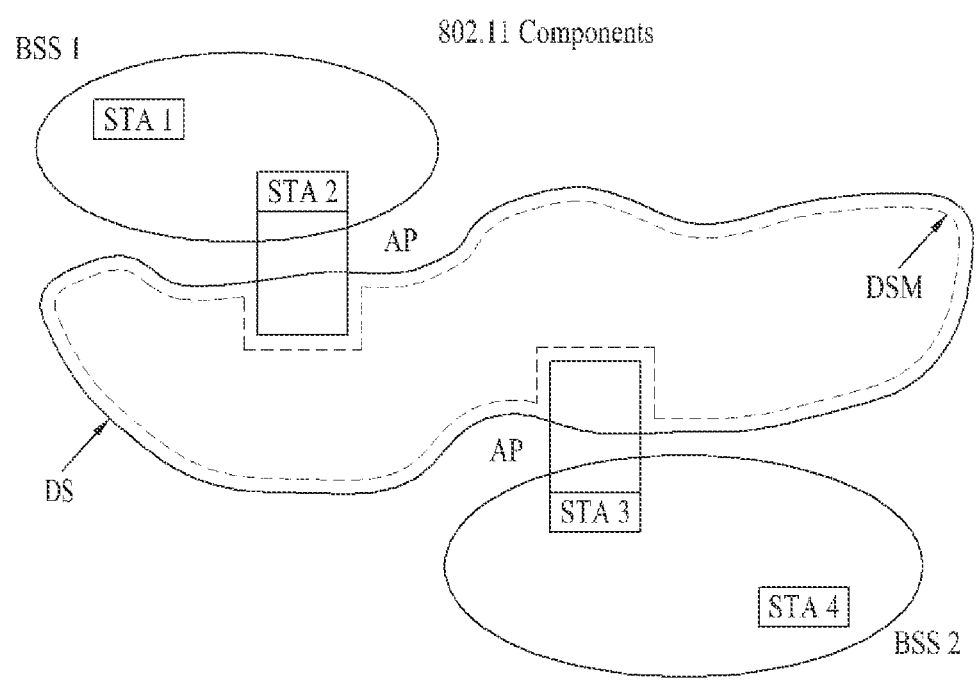
FIG. 2 is a diagram for another example of a structure of IEEE 802.11 system to which the present invention is applicable.

FIG. 2 is a diagram for another example of a structure of IEEE 802.11 system to which the present invention is applicable. In FIG. 2, components including a distribution system (DS), a distribution system medium (DMS), an access point (AP) and the like are added to the structure shown in FIG. 1.

A direct station-to-station distance in LAN may be limited by PHY performance. This distance limit may be enough for some cases. Yet, a station-to-station communication in farther distance may be necessary in some cases. In order to support an extended coverage, a distribution system (DS) may be configured.

The DS means a structure in which BSSs are mutually connected to each other. In particular, BSS may exist as a component of an extended type in a network including a plurality of BSSs instead of existing independently as shown in FIG. 1.

The DS corresponds to a logical concept and may be specified by a feature of a distribution system medium (DSM). Regarding this, IEEE 802.11 standard logically discriminates a wireless medium (WM) and a distribution system medium (DSM) from each other. Each of the logical media is used for a different purpose and is also used by a different component. According to the definitions in the IEEE 802.11 standard, the media are not limited to the same or the different. Thus, considering the fact that a plurality of media are logically different from each other, the flexibility of the IEEE 802.11 LAN structure (e.g., DS structure, other network structures, etc.) can be explained. In particular, the IEEE 802.11 LAN structure can be implemented into various examples. And, the corresponding LAN structure can be specified independently by a physical property of each of the implementation examples.

The DS can support a mobile device in a manner of providing seamless integration of a plurality of BSSs and logical services necessary for handling an address to a destination.

The AP means an entity that enables associated STAs to access a DS via WM and has STA functionality. Via the AP, data transfer between BSS and DS can be performed. For instance, STA 2 shown in FIG. 2 has functionality of STA and provides a function of enabling an associated STA (i.e., STA 1) to access a DS. For another instance, STA 3 shown in FIG. 2 has functionality of STA and provides a function of enabling an associated STA (i.e., STA 4) to access a DS. Since every AP basically corresponds to STA, it is an addressable entity. It may not be necessary for an address used by AP for communication on WM to be identical to an address used by AP for communication on DSM.

Data transmitted from one of STAs associated with an AP to an STA address of the AP is always received by an uncontrolled port and can be processed by IEEE 802.1X port access entity. Once a controlled port is authenticated, a transmitted data (or frame) can be forwarded to a DS.

Figure 3:
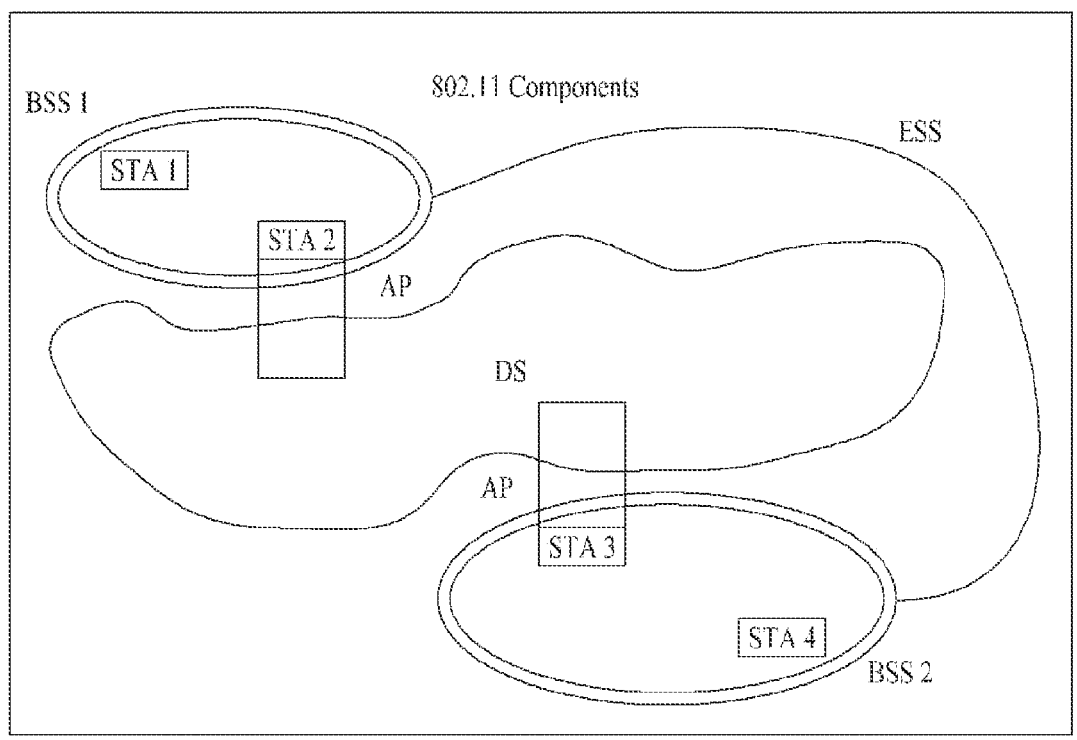
FIG. 3 is a diagram for a further example of a structure of IEEE 802.11 system to which the present invention is applicable.

FIG. 3 is a diagram for a further example of a structure of IEEE 802.11 system to which the present invention is applicable. FIG. 3 conceptually shows an extended service set (ESS) to additionally provide a wide coverage to the structure shown in FIG. 2.

A wireless network having an arbitrary size and complexity can be configured with a DS and BSSs. In IEEE 802.11 system, such a network is called an ESS network. The ESS may correspond to a set of BSSs connected to a single DS. Yet, the ESS does not include the DS. The ESS network is characterized in looking like an IBSS network in LLC (logical link control) layer. STAs included in the ESS can communicate with each other and mobile STAs can move away from one BSS into another BSS (within the same ESS) in a manner of being transparent to LLC.

IEEE 802.11 assumes nothing about relatively physical locations of the BSSs shown in FIG. 3 and enables the following types. First of all, BSSs can overlap with each other in part, which is the type generally used to provide a continuous coverage. BSSs may not be connected to each other physically and no limitation is put on a distance between BSSs logically. BSSs can be physically situated at the same location, which can be used to provide redundancy. One IBSS (or at least one IBSS) or ESS networks can physically exist as one ESS network (or at least one ESS network) in the same space. This may correspond to an ESS network type in one of a case that an ad-hoc network operates at an ESS network exiting location, a case that IEEE 802.11 networks physically overlapping with each other are configured by different organizations, a case that at least two difference access and security policies are necessary at the same location and the like.

Figure 4:
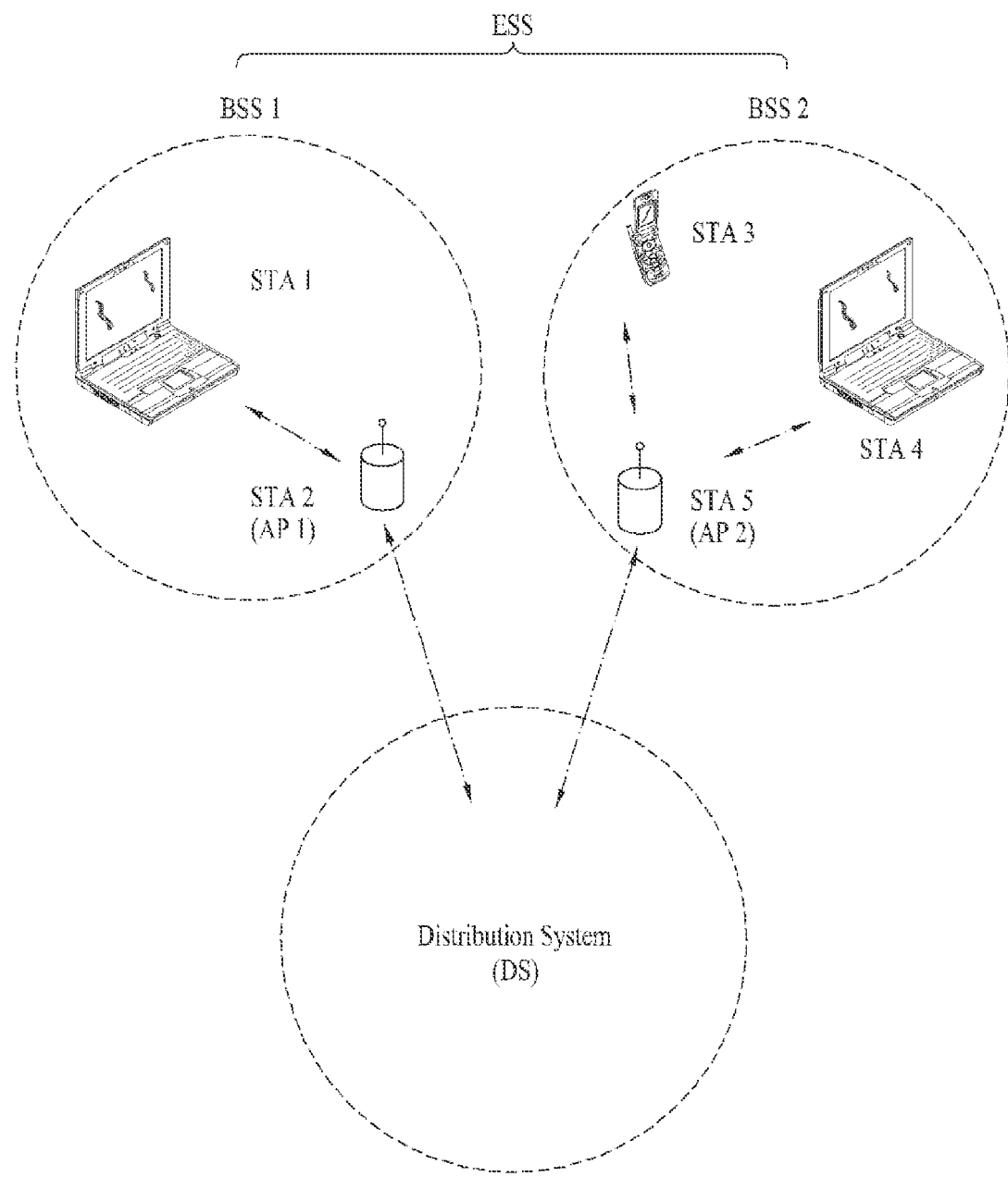
FIG. 4 is a diagram for one example of a structure of WLAN system.

FIG. 4 is a diagram for one example of a structure of WLAN system. In particular, FIG. 4 shows one example of BSS of a basic structure including a DS.

In the example shown in FIG. 4, BSS 1 and BSS 2 configure an ESS. In WLAN system, STA is a device that operates by MAC/PHY regulations of IEEE 802.11. The STA includes an AP STA and a non-AP STA. The non-AP STA generally corresponds to such a device directly handled by a user as a laptop, a mobile phone and the like. In the example shown in FIG. 4, STA 1, STA 3 and STA 4 correspond to non-AP STAs. And, STA 2 and STA 5 correspond to AP STAs.

In the following description, the non-AP STA can be called a terminal, a Wireless Transmit/Receive Unit (WTRU), a User Equipment (UE), a Mobile Station (MS), a Mobile Terminal, a Mobile Subscriber Station (MSS) or the like. And, the AP includes the concept corresponding to a Base Station (BS), a Node-B, an evolved Node-B (eNB), a Base Transceiver System (BTS), a Femto BS or the like in other wireless communication fields.

Available Channel List of STA in TV Whitespace

In order not for an incumbent user but for an STA to operate in TV whitespace (TVWS), the corresponding STA should acquire a channel, which does not cause influence to the incumbent user at a specific location, i.e., an available channel list to protect the incumbent user and is then able to operate correspondingly.

An enabling procedure in TVWS is described as follows. First of all, 'enabling' means allowing a prescribed STA to transmit a signal within a corresponding network. When an unlicensed device operated on such a license required band as TVWS, the unlicensed device can be classified into one of two types. In particular, one is an enabling STA and the other is a dependent STA.

The enabling STA is the STA that can enable another dependent STA. The enabling STA can transmit a signal by itself despite not receiving an enabling signal and is able to initiate a network. On the other hand, the dependent STA can transmit a signal only if receiving an enabling signal from the enabling STA. And, the dependent STA can operate under the control of the enabling STA. As representative examples of an enablement process, a scheme of using a DSE (dynamic STA enablement) registered location element and a scheme of using RLQP (registered location query protocol) are described as follows.

First of all, a scheme of using a DSE registered location element is described in the following description. IEEE 802.11y standard handles operations of an unlicensed device on 3.5 GHz band. A DSE (dynamic STA enablement) process is explained. According to this, an enabling STA can transmit a DSE registered location element for enablement of a dependent STA.

FIG. 5 is a diagram of DSE (dynamic STA enablement) registered location element format. Referring to FIG. 5, a DSE registered location element format may include 1-octet element ID field, 1-octet length field and 20-octect DSE registered location element body field. FIG. 6 is a diagram of a configuration of DSE registered location element body field. Referring to FIG. 6, the DSE registered location element body field may include information on a latitude, information on a longitude, information on an altitude, data, RegLoc (registered location) DSE bit and the like. The IEEE 802.11y standard document can be referred to for the details of the DSE registered location element.

An enabling STA can set the RegLoc DSE bit to 1 when transmitting a DSE registered location element to a dependent STA. The DSE registered location element can be transmitted in a beacon frame or a probe response frame. Having received and decoded the DSE registered location element via the beacon or frame response frame, the dependent STA can transmit an enablement request frame for a channel indicated by the DSE registered location element. If the dependent STA receives an enablement response frame in response to the enablement request frame, the enabling process of the corresponding dependent STA can be completed. FIG. 7 is a diagram of a structure of a DSE enablement frame. The DSE enablement request frame and the DSE enablement response frame can be transceived using the frame structure shown in FIG. 7.

Meanwhile, RLQP (registered location query protocol) can be utilized as another scheme of enablement. DSE enablement can be performed using GAS (generic advertisement service) protocol defined in IEEE 802.11u standard.

The STA supportive of GAS protocol can transmit an interworking element in a manner that the interworking element is included in a beacon frame or a probe response frame. Moreover, the GAS supportive STA can transmit an advertisement protocol element. In this case, information on an advertisement protocol ID supported by the corresponding STA can be included in the advertisement protocol element.

Figure 9:
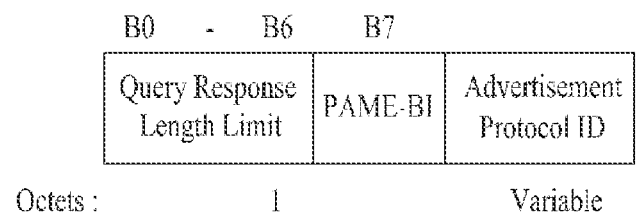
FIG. 9 is a diagram of a configuration of an advertisement protocol tuple.

FIG. 8 is a diagram of an advertisement protocol information element format. The advertisement protocol information element can be transmitted through a beacon frame or a probe response frame. The advertisement protocol information element format can include an element ID field, a length field and a plurality of advertisement protocol tuples. FIG. 9 is a diagram of a configuration of an advertisement protocol tuple. A single advertisement protocol tuple can include a query response length limit field, a PAME-BI (pre-association message exchange BSSID independent) field and an advertisement protocol ID. The query response length limit field indicates a maximum length of a query response. The PAME-BI indicates whether an advertisement server will return a query response. And, the advertisement protocol ID indicates what an advertisement protocol supported by an STA is. Table 1 shown in the following shows one example of an advertisement protocol ID value.

TABLE 1

| Name | Value |
| --- | --- |
| Access Network Query Protocol | 0 |
| MIH Information Service | 1 |
| MIH Command and Event Services Capability Discovery | 2 |
| Emergency Alert System (EAS) | 3 |
| Registered Location Query Protocol | 4 |
| Reserved | –4-5-220 |
| Vendor Specific | 221 |
| Reserved | 222-255 |

Referring to Table 1, various contents can be delivered in accordance with an ID value of and advertisement protocol. For instance, if an advertisement protocol ID is 4, it means that RLQP is supported by an AP.

Thus, if an advertisement protocol tuple indicating RLQP is transmitted in a manner of being included in a beacon frame or a probe response frame, the corresponding beacon or probe response frame can be used as an enabling signal on TVWS. In this case, the enabling signal has the meaning of a signal indicating that enablement is possible. Hence, each STA having received the enabling signal can transmit a DSE enablement element using the GAS protocol. IEEE 802.11y standard document can be referred to for the details related to the GAS protocol.

Figure 10:
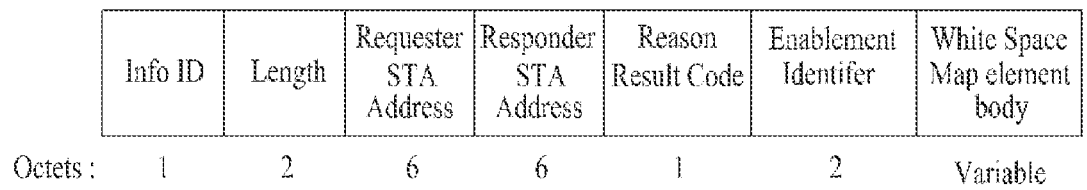
FIG. 10 is a diagram of DSE enablement element format.

FIG. 10 is a diagram of DSE enablement element format. Info field shown in FIG. 10 can include the following information shown in Table 2. Table 2 shows a list of RLQP information ID definition list.

TABLE 2

| Info Name | Info ID | RLQP Info Element (clause) |
| --- | --- | --- |
| Reserved | 0 | N/A |
| DSE Enablement | 1 | 7.3.5.1 |
| Reserved | 2-220 | N/A |
| Vendor Specific | 221 | 7.3.2.26 |
| Reserved | 222-255 | N/A |

For instance, if Info ID field is 1, it can indicate an element format for DSE enablement.

Using the frame structure shown in FIG. 10, STA can transmit DSE enablement request frame to AP through RLQP. It is able to transmit the corresponding RLPQ information using GAS initial request frame. Having received the DES enablement request frame, the AP can grant a DSE enablement to the corresponding STA.

In case of granting the DSE enablement to the STA, it is able to use the frame structure shown in FIG. 10 as well. In doing so, a unique ID is assigned to each STA. The corresponding ID corresponds to an enablement identifier and is transmitted through Enablement Identifier field shown in FIG. 10. Moreover, the AP can transmit an available TV channel list to the STA through a white space map element body field shown in FIG. 10.

Meanwhile, Table 3 shows Reason Result Code values for identifying types of DSE enablement.

TABLE 3

| Reason Result Code field value | Description |
| --- | --- |
| 0 | Reserved |
| 1 | Reserved |
| 2 | Enablement requested |
| 3 | Success |
| 4 | Request declined |
| 5 | Request not successful as one or more parameters have invalid values |
| 6 | Enablement denied because the enabling STA is unable to handle additional dependent STAs |
| 7 | Handshake timeout |
| 8 | Success as dependent AP STA |
| 9 | Success as dependent non-AP STA |
| 10 | Enablement Requested as dependent AP STA |
| 11 | Enablement Requested as dependent non-AP STA |
| 12-255 | Reserved |

Referring to Table 3, in case that a dependent STA desires to operate as a dependent AP STA, it is able to transmit a DSE enablement request frame to an enabling STA by setting a value of Reason Result Code to 8. In case that a dependent STA desires to operate as a dependent non-AP STA, it is able to transmit a DSE enablement request frame to an enabling STA by setting a value of Reason Result Code to 9. In case that there is no type desired by a dependent STA to operate, it is able to transmit a DSE enablement request frame to an enabling STA by setting a value of Reason Result Code to 2.

An available TV channel list of STA is calculated based on location information of the corresponding STA. The location information of the STA may be saved in a registered location server by an administrator or may be determined using a channel availability query (CAQ) request/response frame.

In response to the DSE enablement request frame, the AP can transmit a DSE enablement response frame to the corresponding STA. In this case, as shown in FIG. 10, the DSE enablement response frame may include Enablement Identifier field, White Space Map element body field and the like.

In case that a location of an STA is not registered with a registered location server, a value of Reason Result Code of a DSE enablement response frame can be set to 11. In this case, the corresponding STA is unable to operate as a dependent AP STA and White Space Map is not included in the DSE enablement response frame as well.

On the contrary, in case that a location of an STA is not registered with a registered location server, a value of Reason Result Code of a DSE enablement response frame can be set to 10. In this case, the corresponding STA is able to operate as a dependent AP STA and location-based White Space Map can be included in the DSE enablement response frame as well.

WSM (white space map) means a MAP format prepared to inform an STA whether each TV channel on TVWS band is occupied by a primary channel. And, information on the WSM can be acquired through spectrum sensing or DB access. If WSM is transmitted up to a dependent STA, it is able to reduce AP scanning overhead of the STA. For instance, although a bandwidth of each channel on TV band amounts to 6 MHz, since a bandwidth of each channel on 2.4 or 5 GHz band amounts to 20 MHz, the number of channels to be scanned on the TV band is greater than that on the 2.4 or 5 GHz band. Therefore, WSM can be used to reduce the scanning load of the STA on the TVWS band.

In particular, an enabling STA is able to can transmit information, which indicates whether a TV signal occupies a channel and whether an unlicensed device can use a channel on a TV band, to a dependent STA. In this case, this information can be delivered using WSM. The WSM can be transmitted to the dependent STA via such a management working frame as a beacon frame, a probe response frame, a WSM announcement frame and the like or a response frame for responding to a request. In the course of an enablement process or after successful completion of enablement, the WSM can be transmitted to the dependent STA. Although no limitation is put on a type of WSM format, an available channel number should be signaled. In this case, the available channel number may include a TV channel number of a WLAN channel number. Preferably, the TV channel number may be signaled. A maximum power value allowed for each channel can be indicated through the WSM. Since a channel available on a TV band may be varied by mobility of STA or the like depending on a time and place, the WSM can have a variable length and can indicate the variable length of the WSM. A version of the WSM can be indicated to enable a presence or non-presence of an update of the WSM to be checked. The WSM can be updated in a manner of entirely updating a list of available channels in the whole channel list or only updating channels in part.

In order to operate on TVWS, all dependent STAs should complete the above-mentioned enablement process. In order for a specific dependent STA operating as a non-AP STA to operate as an AP, it is able to perform a CAQ (channel availability query) process. In performing the CAQ process, the STA registers it location by directly accessing a TV band database based on its location or making a registration to the TV band data base via its enabling STA (i.e., an STA having enabled the corresponding STA) and is then able to obtain the available channel information through the CAQ process. In the following description, CAQ processes according to various embodiments of the present invention, which can raise accuracy of the available channel information obtained through the CAQ process and obtain/provide the available channel information efficiently, are explained.

CAQ Process

In the following description, CAQ availability query request/response scheme and its format proposed by the present invention are explained.

First of all, according to the rules for operations on TVWS band, each device desiring to operate on TVWS accesses a TV band database and is then able to obtain an available channel list. In order for a device to obtain the channel list, informations, which should be provided to a database by the device, may include an FCC ID (federal communications commission identifier), a serial number assigned by a device manufacturer, a device type, a geo-location of the device, an information on a transmit power and the like. In this case, the geo-location may have a resolution (e.g., a range of error, a unit of measurement/calculation, etc.) of a prescribed value. For instance, the geo-location information may have a resolution of ±50 m.

A detailed method according to the present invention is proposed as follows. First of all, an STA (e.g., an STA desiring to operate as an AP, an STA desiring to operate by acquiring WSM within TVWS, etc.) sends a CAQ message including a location information of the STA to a database (or an enabling STA). Secondly, the database (or the enabling STA) provides available channel information based on the location information of the STA having sent the CA request to the corresponding STA via a CAQ response message.

The above CAQ request/response message can be received via the RLQP mentioned in the foregoing description. Table 4 shows one example of newly defining Info ID for CAQ request/response in an RLQP information element.

TABLE 4

| Info Name | Info ID | RLQP Info Element (clause) |
|---|---|---|
| Reserved | 0 | N/A |
| DSE Enablement | 1 | 7.3.5.1 |
| Channel Availability Query Request | 2 | |
| Channel Availability Query Response | 3 | |
| Reserved | 4-220 | N/A |
| Vendor Specific | 221 | 7.3.2.26 |
| Reserved | 222-255 | N/A |

Referring to Table 4, a CAQ request may correspond to Info ID 2 and a CAQ response may correspond to Info ID 3.

FIG. 11 is a diagram of a CAQ request element according to one embodiment of the present invention. FIG. 12 is a diagram of a CAQ response element according to one embodiment of the present invention. In particular, FIG. 11 shows one example of a case that a CAQ request is defined in RLQP. And, FIG. 12 shows one example of a case that a CAQ response is defined in RLQP.

Referring to FIG. 11, a CAQ request element may further include new fields proposed by the present invention in addition to the conventional fields including Info ID field, Length field, Requester STA Address field, Responder STA Address field and Enablement field (cf. FIG. 10). In particular, the CAQ request element may further include at least one of FCC Identifier field, Serial Number field, Location Configuration Information (LCI) field, Device Type field, Spectrum Mask Type field, Transmission Power Level field and Service Coverage field. Referring to FIG. 12, the CAQ response field may further include at least one of Device Type field, WSM field and Spectrum Mask Type field, which are proposed by the present invention, in addition to the convention fields including Info ID field, Length field, Requester STA Address field, Responder STA Address field and Enablement field (cf. FIG. 10). The respective fields shall be described in detail in the following description.

FIG. 13 is a diagram of a CAQ request frame according to one embodiment of the present invention. And, FIG. 14 is a diagram of a CAQ response frame according to one embodiment of the present invention. In particular, FIG. 13 shows one example of a case that a CAQ request is defined in form of a public action frame. And, FIG. 14 shows one example of a case that a CAQ response is defined in form of a public action frame.

Referring to FIG. 13, a CAQ request frame may further include at least one of FCC Identifier field, Serial Number field, LCI field, Device Type field, Spectrum Mask Type field, Transmission Power Level field and Service Coverage field, which are proposed by the present invention, in addition to the conventional fields including Category field, Action field, Requester STA Address field, Responder STA Address field and Enablement Identifier field (cf. FIG. 7). Referring to FIG. 14, a CAQ response frame may further include at least one of Device Type field, WSM field and Spectrum Mask Type field, which are proposed by the present invention, in addition to the conventional fields including Category field, Action field, Requester STA Address field, Responder STA Address field, Reason Result Code field and Enablement Identifier field (cf. FIG. 7) The respective fields shall be described in detail in the following description.

The configuration of the CAQ request/response element using RLQP exemplarily shown in FIG. 11/FIG. 12 or the CAQ request/response frame of the public action frame type exemplarily shown in FIG. 13/FIG. 14 is exemplarily illustrated, by which the configuration or type of the CAQ request/response message proposed by the present invention may be non-limited. The contents proposed by the present invention relate to new informations included in the CAQ request/response. And, the configuration or type of the CAQ request/response may be non-limited by the examples mentioned in the foregoing description. In particular, the scope of the present invention includes transceiving at least one of CAQ related informations explained in the following description via CAQ requests/responses of various types or configurations. In the following description, informations (or fields) included in the CAQ request/response proposed by the present invention are explained in detail.

First of all, Requester STA Address is an address of an STA making a request for a CAQ or a MAC address. Responder STA Address is an address of an STA executing a CAQ (i.e., an address of an STA acquiring available channel information in place of a CAQ requester STA and then delivering the acquired information to the CAQ requester) or an address of an STA becoming a final destination of the CAQ request. So to speak, the Requester STA Address may be the address of the STA making a request for the corresponding CAQ. And, the Responder STA Address may be the address of the STA returning the response (e.g., a response including an available channel list (i.e., WSM)) to the CAQ. In this case, it is necessary for the STA returning the WSM to have capability of accessing TVWS band database and geo-location determining capability (i.e., capability of obtaining a location of its own). In some cases, it is necessary for the STA returning the WSM to have the capability of obtaining a location of another STA and a boundary of a location to be serviced by the corresponding STA.

When the responder STA returns the WSM, it is necessary to check whether an STA having requested the WSM (i.e., CAQ requester STA) follows the rules of FCC. In particular, for network stability, security and the like, it is necessary for a device not verified by FCC to be prohibited from operating on TVWS. To this end, the present invention proposes that an FCC ID of a CAQ requester device is included in a CAQ request message. Having received a CAQ request message containing the FCC ID, the STA can operate to return WSM only if the FCC ID of the CAQ requester STA is verified through the TV band database.

This operation related to the verification of the CAQ requester device is related to the aforementioned enablement process. In particular, Responder STA Address may be an address of an enabler STA or an address of a dependent AP. And, Enablement Identifier may become an ID value assigned by an enabler/enabling STA. Moreover, the present invention proposes that Serial number (i.e., an identifier assigned to a device by a manufacturer) is included in the CAQ request message together with FCC ID assigned to the device by FCC. Therefore, CAQ requester STA can be identified more clearly and reliance of the verification and the like can be enhanced.

In the following description, the present invention proposes that an LCI (i.e., a field indicating location information of CAQ requester STAs) is included in a CAQ request message. A value of the LCI includes a latitude, a longitude and an altitude and may further include azimuth information additionally in some cases. A format of this LCI information can be represented as 123 bits B0 to B122 of the DSE Registered location element body field shown in FIG. 6. In this case, a resolution means an error range or a unit of measurement/calculation, a fraction means a fraction, and an integer means an integer part. Hence, if the location information of the STA is included in the CAQ request message, when available channel information for the corresponding STA is determined, a channel available at the corresponding location can be determined easily and conveniently. Moreover, since this location information becomes the basis of determination of a spectrum mask type, a transmit power restriction and the like, which will be described later, if the location information is included in the CAQ request message, it is able to determine the available channel information for the corresponding STA, a maximum transmit power value allowed for the corresponding STA and the like more accurately.

The present invention proposes that a device type field indicating a device type of a CAQ requester STA is included in a CAQ request message. When the CAQ requester STA intends to acquire an available channel list by accessing a DB directly/indirectly, since a list of available channels is configured different depending on a device type, it is necessary to have device type information included in the CAQ request message. The device type can be classified into a fixed mode device or a personal/portable device. The personal/portable devices can be sub-classified into two kinds of types. One of the two types includes a mode II device capable of accessing a DB directly/indirectly and initiating a network with geo-location determination capability and the other includes a mode I device configured to mainly operate as a client. In this case, the fixed mode device is allowed to transmit a signal with a power of maximum 4 W. Yet, a maximum transmit power of the personal/portable device is generally limited to 100 mW. Since the strength of interference on a neighbor channel or a neighbor device differs in accordance with each of the device types, a channel list available for each device type varies despite that a device exists at the same location. Therefore, if the device type information is included in the CAQ request, the available channel information can be determined more accurately.

Meanwhile, different spectrum masks can be supported for the devices of the same device type, respectively. Hence, the present invention proposes that a spectrum mask type field supported by a CAQ requester STA is included in a CAQ request message. In this case, the spectrum mask defines a power restriction on a frequency band.

Table 5 shows reduction in PSD (power spectral density) according to frequency offset per spectrum mask class. And, FIG. 15 is a diagram for examples of a spectrum mask according to Table 5.

TABLE 5

| Spectrum Mask Class | Reduction in Power Spectral Density, dBr | | | | |
|---|---|---|---|---|---|
| | ±4.5 MHz Offset | ±5.0 MHz Offset | ±5.5 MHz Offset | ±10 MHz Offset | ±15 MHz Offset |
| Class A | 0 | −10 | −20 | −28 | −40 |
| Class B | 0 | −35 | −45 | −55 | −65 |

Figure 15:
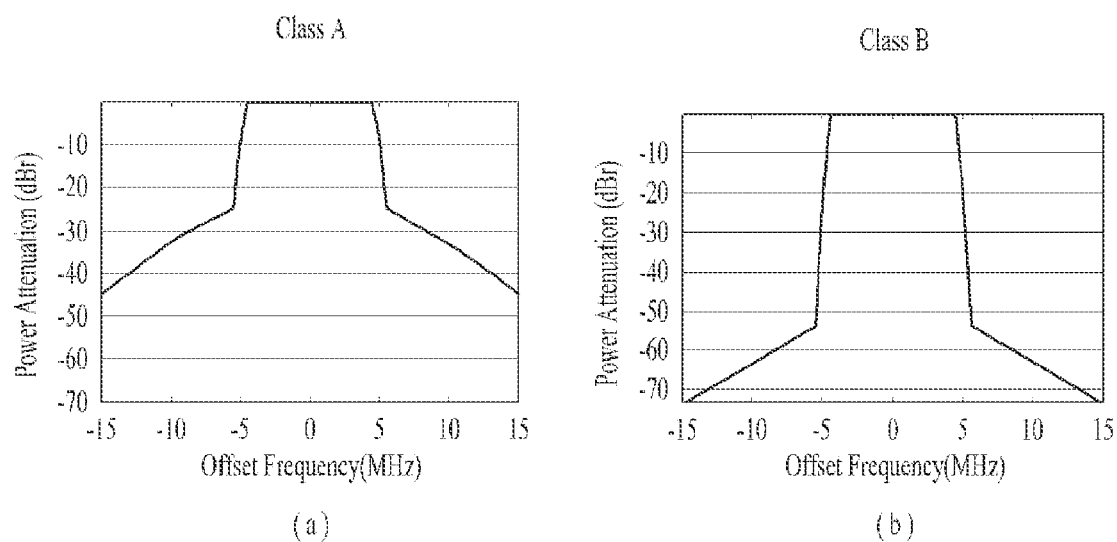
FIG. 15 is a diagram for examples of a spectrum mask.

In an offset frequency range between 5~15 MHz, compared to power reduction applying a spectrum mask of Class B shown in FIG. 15 (b), more power reduction applies to a spectrum mask of Class A shown in FIG. 15 (a). In particular, compared to the case of using the spectrum mask of Class A, the case of using the spectrum mask of Class B has less interference on a neighbor frequency band. So to speak, the spectrum mask Class B has requirements more strict than those of the spectrum mask Class A.

In this case, a device, which uses a specific spectrum mask, should meet a minimum reduction value of PSD in accordance with an offset frequency defined in the corresponding spectrum mask. If devices of the same type support different spectrum mask classes, respectively, since each of the devices has a different level of interference on a neighbor device or a neighbor frequency band, a different available channel list and a different allowable maximum power value can be given to each of the devices. Hence, if a spectrum mask type is considered in determining available channel information, an available channel list and an allowable transmit power value can be determined for a corresponding STA more accurately.

In case that a spectrum mask used by an AP within a specific BSS is different from spectrum masks used by STAs within the specific BSS, an operation of an unlicensed device may possibly cause interference to a licensed device. In particular, when an AP accesses a DB and then receives an available channel list, if an unlicensed device meets an out-band-emission requirement for a neighbor channel under the condition that a licensed device does not use a specific channel at a corresponding timing point, the DB can inform the AP that the corresponding channel is an available channel by signaling. A spectrum mask for out-band-emission for a neighbor channel, which is regulated by FCC, is −55 dBr. For instance, it is able to assume a case that an incumbent user (e.g., DTV) does not use channel #14 despite using channel #13 and channel #15. In this case, in order for a DB to inform an AP (or an STA) that the channel #14 is an available channel by signaling [or in order for the AP (or an STA) to use the channel #14 in case that the DB signals that there is no incumbent user's use on the channel #14], the AP (or STA) should meet the out-band-emission requirement for the channel #13 and the channel #15 in using the channel #14.

Thus, even if the spectrum mask of the AP perfectly meets the out-band-emission requirement, since a spectrum mask of a specific STA associated with the AP is not more strict than that of the AP (e.g., in case that the spectrum mask of the STA corresponds to Class A shown in FIG. 15 (a) despite that the spectrum mask of the AP corresponds to Class B shown in FIG. 15 (b)), the above-mentioned requirement may not be met. In this case, the corresponding system violates the above rules instantly. Therefore, after the AP has acquired the available list from the DB according to the condition, it is necessary to exchange information on the spectrum mask with the STA in the step of association.

To this end, the AP can transmit the information on its spectrum mask in a manner that the information is contained in a beacon frame and/or a probe response frame. And, the STA, which receives the information on the spectrum mask of the AP via a beacon/frame response, should transmit a signal using a spectrum mask more strict than the former spectrum mask signaled by the AP.

Meanwhile, in case that an AP acquires its available channel from another AP without directly accessing a DB, e.g., in case that a dependent AP acquires its available channel information (i.e., WSM) from an enabling STA, it is necessary to exchange information on spectrum masks between the enabling STA and the dependent STA. This spectrum mask information exchange may be performed in the enablement process or the CAQ process. For each of the cases, the information (e.g., Spectrum Mask Type field in the example shown in FIG. 11 or FIG. 13) on the spectrum mask of the dependent AP can be transmitted in a manner of being included in DSE enablement request frame or CAQ request frame. Having received this information, the enabling STA can make a request for the available channel information to the DB based on the information, which was received from the dependent AP, on a location (LCI field), device type (Device Type field) and spectrum mask (Spectrum Mask Type field) of the dependent AP. The DB determines/calculates an available channel list in consideration of all of the location, type and spectrum mask informations of the device and is then able to signal the available channel list to the enabling STA. Having received the available channel list from the DB, the enabling STA is able to deliver an information indicating that the corresponding available channel list relates to a specific device type and an information indicating that the corresponding available channel list relates to a specific spectrum mask (e.g., Device Type field and Spectrum Mask Type field in the example shown in FIG. 12 or FIG. 14) together with the available channel list when delivering the available channel list (i.e., WSM) to the dependent STA. These informations can be included in DSE enablement response frame or CAQ response frame.

Alternatively, when an information on a device type, an information on WSM and an information on a spectrum mask type are delivered via a response frame, the information on the device type and the information on the spectrum mask type can be transmitted in a manner of being included in the WSM. Having received theses informations, each STA can use the corresponding WSM only if meeting the corresponding device type and the corresponding spectrum mask type.

If an STA sends a CAQ request message including such information as LCI, device type, spectrum mask type and the like, an enabling STA received the CAQ request message and is then able to deliver a channel list available for a location of the CAQ requester STA to the CAQ requester STA via a CAQ response frame. For instance, the available channel list can be transmitted in form of WSM. In doing so, in the CAQ response message, field(s) (e.g., a device type field and/or a spectrum mask type field) indicating that the delivered available channel list (i.e., WSM) is the WSM applicable to a prescribed device type and/or a prescribed spectrum mask type can be included separately from a WSM field or in the WSM field.

In the following description, the present invention proposes that at least one of an information on a transmit power level and an information on a service coverage is included in a CAQ request message. Generally, a service coverage of STA can be determined in accordance with a size of a transmit power used by the STA. Since the size of the transmit power used by the STA is directly related to a size of interference on a neighbor device and/or a neighbor frequency band, a DB may or may not allow a use of a specific channel depending on how much transmit is used to transmit a signal by the STA. And, available channel information is the information having a location-specific attribute of the STA. In particular, it is able to determine a channel available for a location depending on whether the STA is situated at the corresponding location. Therefore, it is able to determine the available channel information for the corresponding location in consideration of the location information of the STA. In particular, it is able to determine an available channel more accurately by considering an arrival distance of a transmitted signal of the STA (i.e., a service coverage in accordance with a transmit power) together with the location information of the STA.

In more particular, accuracy of location related information (e.g., location (i.e., latitude, longitude and latitude) of STA, transmit power of STA, service coverage, etc.) and accuracy of available channel information are determined depending on the accuracy of the STA location determined by the STA. Specifically, the STA can make a CAQ request in a manner of recognizing resolution (e.g., error range, unit of measurement/calculation, etc.) of the STA location information reported by the STA and then reflecting the service coverage in accordance with the size of the transmit power of the STA. In this case, it is able to report items of the resolution of the location information using a specific one of subfields of the LCI field (e.g., LCI field shown in FIG. 11 or FIG. 13, etc.).

FIG. 16 is a diagram of one structure of LCI field according to one embodiment of the present invention. Referring to FIG. 16, an LCI field may include subfields of resolution, fraction and integer of each of latitude, longitude and altitude and a subfield of an altitude type. In this case, the latitude/longitude/altitude is expressed with integer and fraction for example. And, the LCI field may include an information indicating the latitude/longitude/altitude with a specific location point and a resolution information. In this case, a resolution value for each of the latitude, longitude and altitude should met a minimum resolution requested by the regulation corresponding to a regulatory domain (e.g., country, frequency, etc.). For instance, the minimum resolution requested by FCC is the resolution of ±100 m.

In this case, as mentioned in the forgoing description of the former example, although the service coverage field may be configured separately from the LCI field, it is able to signal an information on a service coverage (or an operating range) using a resolution field of the LCI field. In particular, if a STA is aware of it location and information on its location, it is able to use a method of delivering a modified resolution value in consideration of a service coverage. For instance, assuming that an STA is aware of its location and is also aware that a resolution for a corresponding location is 100 m, if a service coverage desired by the corresponding STA is 100 m, it is able to send a CAQ request message in a manner that a value corresponding not to actual 100 m but to 200 m is included as a resolution value in a resolution subfield. If an actual resolution is 100 m with reference to a specific location point at which an STA exists, it means that the STA is located within an error range of 100 m from the corresponding location point. In this case, considering a case that a service coverage (or an operating range) of the STA is 100 m, if there is no error, a range of a radius 100 m from the specific location point becomes a service coverage. If the error is maximum, a range of a radius 100 m centering on a location spaced apart from the specific location point by a maximum error (100 m) becomes a service coverage. If an actual resolution value and a desired service coverage are expressed as a single range, it becomes a range amounting to a value resulting from adding a desired service coverage range (100 m) to the actual resolution value (100 m). Hence, in aspect of the CAQ requester STA, the CAQ requester STA can announce that the CAQ requester STA can exit within an error range of 200 m from a specific location point by reporting that the resolution is 200 m with reference to the specific location point, which indicates that the CAQ requester STA is going to operate within the range of the radius 200 mn from the corresponding location point. Thus, in case that the service coverage (or operating range) information is delivered by utilizing the resolution subfield of the LCI field of the CAQ request message, signaling can be efficiently performed in a manner of reducing a payload size of the CAQ request message.

Meanwhile, an STA can may a request for an available channel list relating to a plurality of locations in a manner that information on a plurality of the locations is included in a CAQ request message. FIG. 17 is a diagram for one example of LCI field including information on a plurality of locations according to one embodiment of the present invention. Referring to FIG. 17, Length field includes information on lengths of subsequent fields. Latitude Resolution field to Altitude Integer field can be repeated in accordance with a value of the Length field. For instance, when Latitude Resolution field to Altitude Integer field are configured with total 16-octet (=128-bit) length, if a value of the Length field indicates N×16 octets, the Latitude Resolution field to Altitude Integer field can be repeated N times. In this case, since information on a latitude, longitude, altitude and resolution for one location is included in each 1-time repetition, since repetitions are performed N times, information on a latitude, longitude, altitude and resolution for each of N locations is included.

WSM for each of a plurality of locations should be included in a CAQ response message in response to a CAQ request message including information on a plurality of locations. Alternatively, WSM usable in common to all of a plurality of the locations, which is requested to a CAQ requester STA, may be included in the CAQ response message.

Moreover, in case of attempting to make a request for an available channel list applicable in common to an area including a prescribed service radius with reference to a current location, LCI field included in a CAQ request message can have the configuration shown in FIG. 18. The LCI field shown in FIG. 18 corresponds to an example that further includes a radius field for latitude, longitude and altitude in addition to the former LCI field shown in FIG. 16.

In the aforementioned examples, the case of representing the service coverage information as a modified resolution value is described. On the contrary, a value corresponding to a resolution can be included in a service radius information. In particular, a value of the modified Radius field can be set to a service radius value (e.g., a value resulting from adding a service radius to an actual resolution value) that considers an error range of an actual resolution. In this case, Latitude Resolution field, Longitude Resolution field and Altitude Resolution field can be omitted from the LCI field. Instead, it is able to represent a radius information in consideration of resolution using the Latitude Resolution field, the Longitude Resolution field and the Altitude Resolution field only. LCI format for this case is exemplarily shown in FIG. 19. Referring to FIG. 19, Latitude Resolution/Radius, Longitude Resolution/Radius and Altitude Resolution/Radius indicate the modified Radius field.

In case of attempting to indicate latitude/longitude/altitude value for one location using LCI field format including Radius field, as shown in FIG. 18, values of Latitude Radius, Longitude Radius and Altitude Radius can be set to 0. In order to determine not an available channel list for one location but an available channel list capable of covering a prescribed service radius, values of Latitude Radius, Longitude Radius and Altitude Radius indicate a service radius with reference to a current location. In this case, the current location can be expressed as Latitude Fraction, Latitude Integer, Longitude Fraction, Longitude Integer, Altitude Fraction and Altitude Integer.

When an STA having received a CAQ request message provides an available channel list via a CAQ response message, the present invention proposes that the available channel list is transmitted in form of WLAN channel list instead of a TV channel list, as mentioned in the foregoing description of the former examples. Hence, the CAQ response element shown in FIG. 12 can be modified into the form shown in FIG. 20. And, the CAQ response public action frame shown in FIG. 14 can be modified into the form shown in FIG. 21. In particular, instead of the WSM field used for the case of providing a TV channel list, a form (i.e., an operating class field, a channel number field and a power constraint field) of WLAN channel list can be included in a CAQ response message. In this case, the operating class means that a class index is given to each set by previously defining a set of frequency bands (channels) for radio operations for each regulatory domain (e.g., frequency, country, etc.). The channel number is the number given to indicate a specific channel in the corresponding operating class. The power constraint means a value for constraining a maximum power value on the corresponding channel. The three fields including the operating class field, the channel number field and the power constraint field can be repeated. The count of the repetitions can be determined depending on a value of Length field for example. And the count of the repetitions can be varied depending on the number of channels provided as the available channel list. In the examples shown in FIG. 20 and FIG. 21, although the spectrum mask type field mentioned in the description of the former examples shown in FIG. 11 and FIG. 14 is not shown, when an available channel list is provided in form of WLAN channel list, the spectrum mask type field can be included if necessary.

Having performed the CAQ process mentioned in the above description, an STA (or a dependent STA) can operate as an AP (or a dependent AP). In particular, since the STA can acquire the available channel information at its location through the CAQ process, the corresponding STA can initiate a network at the corresponding location. In this case, it is able to assume a case that the STA performing the aforementioned CAQ process is a mobile AP failing to have a wired connection to an enabling STA or an RLS (registered location server). Although this STA acquires available channel information from a DB by completing the CAQ process at a prescribed location, if the STA moves into a new location, it is necessary to newly receive available channel information at the new location [i.e., as mentioned in the foregoing description, after the STA has acquired available channel information applicable to a plurality of locations individually or in common, if the STA moves into a location other than a plurality of the locations associated with the acquired available channel information, the STA needs to receive new available channel information.]. In this case, in order to make a request for channel information, the STA can send a CAQ request message to deliver its geo-location information to the enabling STA or the RLS. In doing so, the CAQ request message can be sent in a manner that the informations (e.g., FCC ID field, Serial number field, Device Type field, etc.) unchanged in the aforementioned examples are not included in the CAQ request field and a receiving side can reuse the previously received information. Preferably, LCI field is included in the CAQ request message sent at the changed location and other fields are omitted. Hence, informations sent in a previous CAQ request message can be reused.

Figure 22:
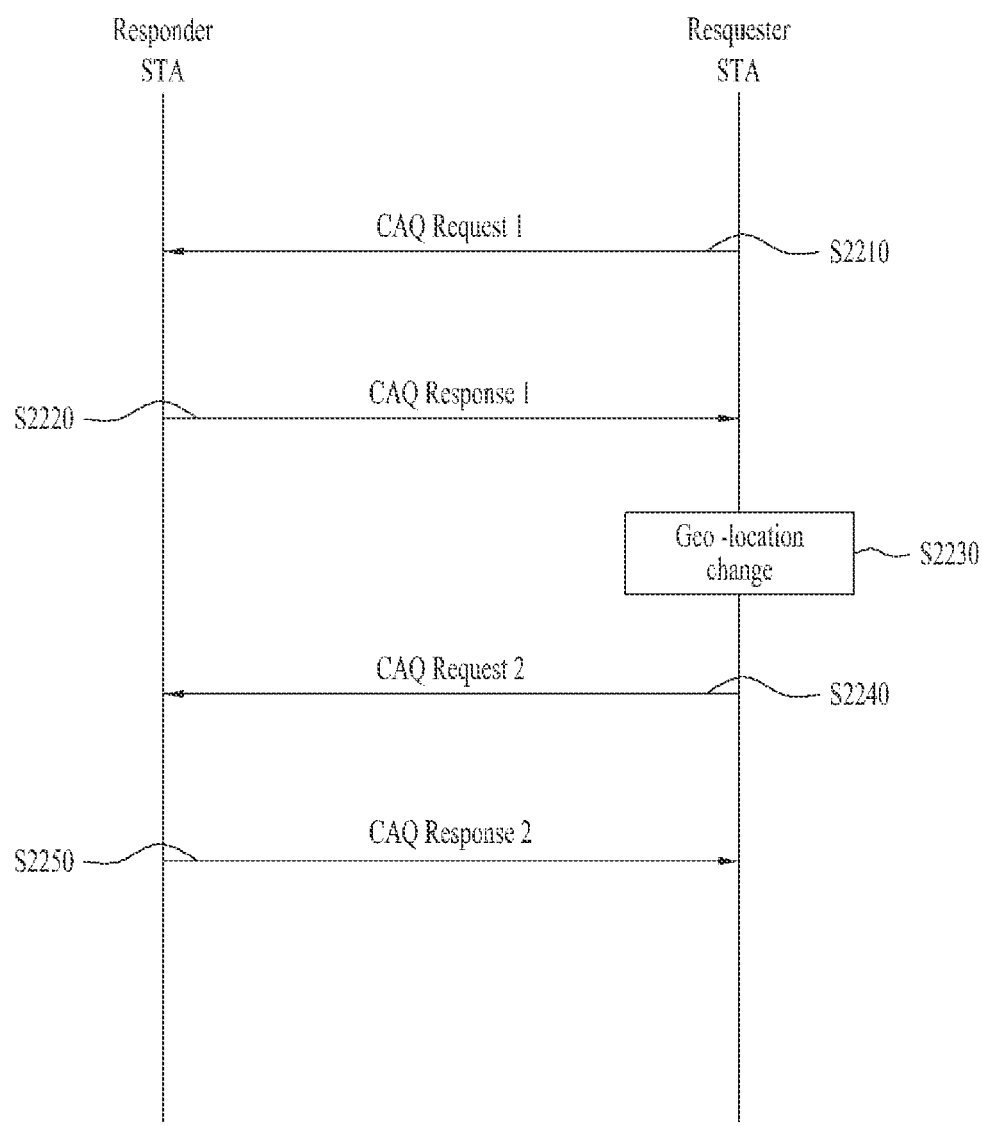
FIG. 22 is a flowchart for a method of transceiving CAQ request/response according to one embodiment of the present invention.

FIG. 22 is a flowchart for a method of transceiving CAQ request/response according to one embodiment of the present invention.

In a step S2210, a requester STA sends a CAQ request message 1 to a responder STA. The responder STA is then able to receive the CAQ request message 1. In this case, as proposed by the aforementioned various embodiments of the present invention, the CAQ request message 1 can include at least one of informations including a location information of the requester STA, a transmit power level, a service coverage and the like. For instance, the CAQ request message may correspond to a message asking for a channel on which the requester STA can transmit a signal with a transmit power X1 at K ($\geq$1) locations. Simultaneously, the CAQ request message may correspond to a message asking for channels respectively available within operating ranges R1 to RK at K locations or a message asking for a channel available in common at a maximum radius Rmax for K locations.

In a step S2220, the responder STA calculates a channel available for the requester STA using the information included in the CAQ request message 1 received in the step S2210 and is then able to transmit the calculated channel to the requester STA via a CAQ response message 1. The requester STA then receives the CAQ response message 1. The responder STA can directly calculate an available channel list based on the informations including the location information of the requester STA, the transmit power level, the service coverage and the like. Alternatively, the responder STA acquires an available channel list by accessing a DB via internet or the like and is then able to deliver the acquired available channel list to the requester STA. For instance, the CAQ response message may include an information on an available channel at a location reported by the requester STA and/or an information on transmit power restriction for transmitting the corresponding available channel with a transmit power X2.

In a step S2230, as the requester STA has moved, a geo-location may be changed. If so, the available channel information acquired in the step S2220 may be no longer usable at the changed geo-location. Hence, a new CAQ request/response process may be performed in a step S2240 and a step S2250.

A CAQ request message sent by the requester STA in the step S2240 can be created in the same structure of the former CAQ request message 1 in the step S2210. Alternatively, informations changed different from those of the CAQ request message 1 in the step S2210 may be included in the CAQ request message 2.

In the step S2250, the responder STA calculates an available channel list by itself based on the information included in the CAQ request message 2 or acquires an available channel list from a DB by accessing the DB and is then able to send a CAQ response message 2 including the calculated or acquired available channel list.

In the above-described CAQ request/response transceiving method, the contents and/or items explained in the descriptions of the various embodiments of the present invention may be independently applicable or at least two embodiments of the present invention may be simultaneously applicable. And, redundant descriptions shall be omitted from the following description for clarity.

Figure 23:
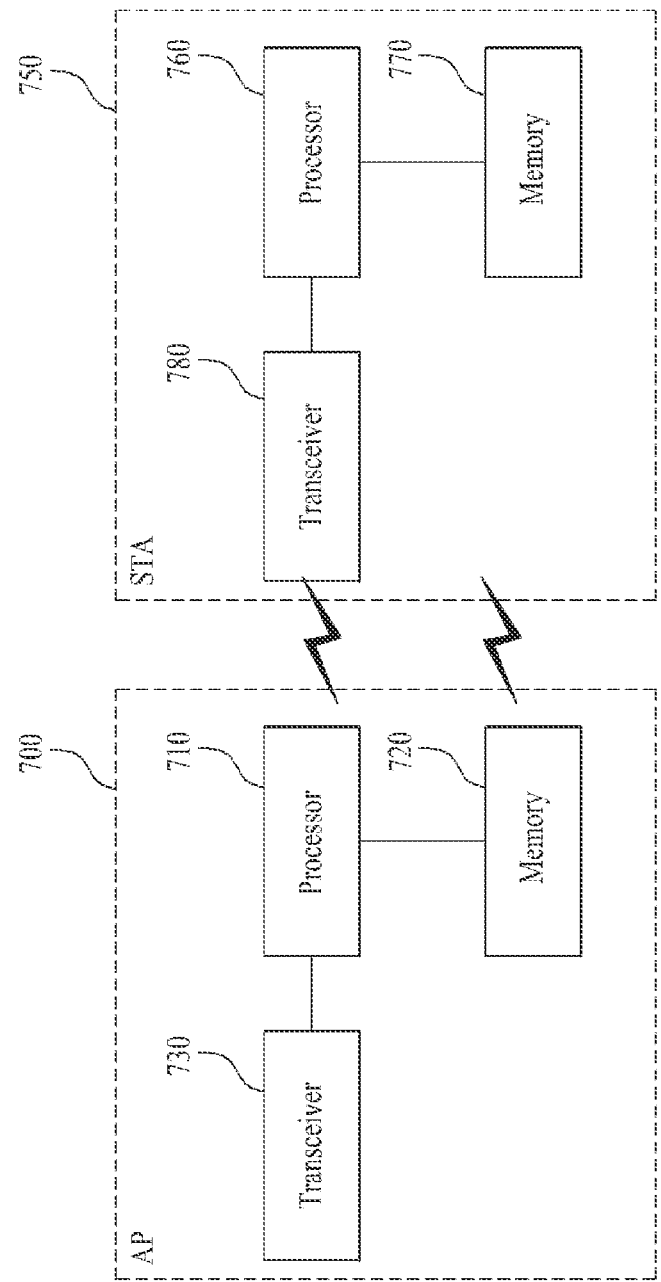
FIG. 23 is a block diagram for a configuration of a wireless device according to one embodiment of the present invention.

FIG. 23 is a block diagram for a configuration of a wireless device according to one embodiment of the present invention.

Referring to FIG. 23, an AP 700 may include a processor 710, a memory 720 and a transceiver 730. And, an STA 750 may include a processor 760, a memory 770 and a transceiver 780. The transceiver 730/780 can transmit and receive radio signals and is able to implement a physical layer according to IEEE 802 system for example. The processor 710/760 is connected to the transceiver 730/780 and is able to implement a physical layer and/or a MAC layer according to IEEE 802 system. The processor 710/760 configures and interprets CAQ request and response messages according to the various embodiments of the present invention mentioned in the foregoing description and may be configured to perform wireless communications on a white space band via the transceiver 730/780. Modules for implementing operations of the AP and STA according to the various embodiments of the present invention mentioned in the foregoing description are saved in the memory 720/770 and can be executed by the processor 710/760. The memory 720/770 is included in the processor 710/760. Alternatively, the memory 720/770 is installed outside the processor 710/760 and is then connected to the processor 710/760 via a means known to the public.

In the above-mentioned detailed configurations of the AP and STA devices, the contents or items explained in the descriptions of the various embodiments of the present invention may be independently applicable or at least two embodiments of the present invention may be simultaneously applicable. And, redundant descriptions shall be omitted from the following description for clarity.

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. Therefore, the present invention is non-limited by the embodiments disclosed herein but intends to give a broadest scope matching the principles and new features disclosed herein.

INDUSTRIAL APPLICABILITY

The embodiments of the present invention mentioned in the foregoing description are mainly explained with reference to IEEE 802.11 system and may be applicable in the same manners to various kinds of mobile communication systems for an unlicensed device to perform a channel availability query procedure on a white space band.

What is claimed is:

1. A method for performing channel availability query using a Generic Advertisement Service (GAS) protocol by a requester station (STA) in a wireless communication system, the method comprising:
   transmitting a GAS query request including a Registered Location Query Protocol (RLQP) element, comprising a first information ID field and a location information field, to a responder STA, the location information field comprising information on a plurality of locations of the requester STA; and
   receiving a GAS query response comprising a RLQP element, comprising a second information ID field and a White Space Map (WSM) information field, from the responder STA, the first information ID field and the second information ID field each comprising a value corresponding to a Channel Availability Query (CAQ), the WSM information field comprising a WSM information applicable for any location within the bounded area defined by the plurality of locations.

2. The method of claim 1, wherein the GAS query request and the GAS query response each further comprise a device type field having information indicating a characteristic of the requester STA.

3. The method of claim 1, wherein the WSM information comprises an information on a transmit power level of the requester STA.

4. The method of claim 3, wherein the WSM is determined based on at least one of the location information of the requester STA and the information on the transmit power level.

5. The method of claim 1, wherein the GAS query request further comprises information on a service coverage of the requester STA.

6. A requester station (STA) adapted to perform channel availability query using a Generic Advertisement Service (GAS) protocol in a wireless communication system, the station comprising:
   a processor configured to generate a GAS query request comprising a Registered Location Query Protocol (RLQP) element, comprising a first information ID field and a location information field, the location information field comprising information on a plurality of locations of the requester STA; and
   a transceiver configured to:
      transmit the generated GAS query request to a responder STA; and
      receive a GAS query response comprising a RLQP element, comprising a second information ID field and a White Space Map (WSM) information field, from the responder STA, the first information ID field and the second information ID field each comprising a value corresponding to a Channel Availability Query (CAQ), the WSM information field comprising a WSM information applicable for any location within the bounded area defined by the plurality of locations.

7. The station of claim 6, wherein the GAS query request and the GAS query response each further comprise a device type field comprising information indicating a characteristic of the requester STA.

8. The station of claim 6, wherein the WSM information comprises an information on a transmit power level of the requester STA.

9. The station of claim 8, wherein the WSM is determined based on at least one of the location information of the requester STA and the information on the transmit power level.

10. The station of claim 6, wherein the GAS query request further comprises information on a service coverage of the requester STA.

* * * * *